US012594859B2

(12) United States Patent
Yoshiga et al.

(10) Patent No.: US 12,594,859 B2
(45) Date of Patent: Apr. 7, 2026

(54) VEHICLE SEAT

(71) Applicants: NHK SPRING CO., LTD., Yokohama (JP); SUBARU CORPORATION, Tokyo (JP)

(72) Inventors: Kensuke Yoshiga, Yokohama (JP); Yukinori Mikita, Yokohama (JP); Kenji Nagumo, Tokyo (JP); Fumito Kitanaka, Tokyo (JP)

(73) Assignees: NHK Spring Co., Ltd., Yokohama (JP); Subaru Corporation, Tokyo (JP)

( * ) Notice: Subject to any disclaimer, the term of this patent is extended or adjusted under 35 U.S.C. 154(b) by 242 days.

(21) Appl. No.: 18/418,789

(22) Filed: Jan. 22, 2024

(65) Prior Publication Data

US 2024/0246458 A1 Jul. 25, 2024

(30) Foreign Application Priority Data

Jan. 25, 2023 (JP) ................................. 2023-009633

(51) Int. Cl.
| | |
|---|---|
| *B60N 2/06* | (2006.01) |
| *B60N 2/02* | (2006.01) |
| *B60N 2/16* | (2006.01) |
| *B60N 2/64* | (2006.01) |

(52) U.S. Cl.
CPC ................. *B60N 2/06* (2013.01); *B60N 2/16* (2013.01); *B60N 2/64* (2013.01); *B60N 2/02246* (2023.08)

(58) Field of Classification Search
CPC ............... B60N 2/06; B60N 2/16; B60N 2/64
See application file for complete search history.

(56) References Cited

U.S. PATENT DOCUMENTS

2023/0347802 A1 11/2023 Watanabe et al.

FOREIGN PATENT DOCUMENTS

| | | | | |
|---|---|---|---|---|
| JP | 2003072438 A | * | 3/2003 |
| JP | 2007276628 A | * | 10/2007 |
| JP | 2008260327 A | * | 10/2008 |
| JP | 2022-051709 A | | 4/2022 |

* cited by examiner

*Primary Examiner* — Anthony D Barfield
(74) *Attorney, Agent, or Firm* — Knobbe, Martens Olson & Bear, LLP

(57) ABSTRACT

A vehicle seat includes: a seat cushion frame; a side finisher provided at a side of the seat cushion; a circuit board positioned between the side frame and the side finisher in a side view; a support case supporting the circuit board and positioned between the side frame and the side finisher in a side view; and a board-connected cable including a first end connected to the circuit board, a flexible cable main body that extends from the first end, and a second end that is a connector connectable to an electric cable for supplying power to an electric actuator. The support case is integrated to the side finisher; the support case is installable to the side frame; and the support case includes a cable protection section that, in a side view, overlaps with at least part of the cable main body and that does not overlap with at least the connector.

4 Claims, 8 Drawing Sheets

UP

FR

VEHICLE SEAT

CROSS-REFERENCE TO RELATED APPLICATION

This application claims priority under 35 USC 119 from Japanese Patent Application No. 2023-9633 filed Jan. 25, 2023, the disclosure of which is incorporated by reference herein in its entirety.

BACKGROUND

Technical Field

The present disclosure relates to a vehicle seat.

Related Art

A vehicle seat disclosed in Japanese Patent Application Laid-Open (JP-A) No. 2022-51709 includes a seat cushion frame including a side frame, a side finisher (recliner cover), a support case (base cover), a switching unit, and a cable connected to the switching unit (board-connected cable). The side finisher is a member provided at a one-side portion of the seat cushion. The support case is positioned between the side frame and the side finisher, and supports the switching unit.

The support case is fixed to an inner side face of the side finisher. Furthermore, an engagement hole is provided at the side frame, and an engagement projection is provided at the support case. The support case, the switching unit, and the side finisher are installed to the side frame by the engagement projection of the support case integrated to the switching unit and the side finisher being inserted into the engagement hole.

SUMMARY

A cable for supplying power to an electric actuator is connected to the switching unit of JP-A No. 2022-51709 to supply power to an electric actuator. However, the cable is inserted into a gap between the support case and the side finisher installed to the side frame so as to be connected with the switching unit, and connecting the cable to the switching unit is not easy.

On the other hand, it is not difficult to connect the cable to the switching unit by utilizing this gap prior to the support case being installed to the side frame.

However, such cases give rise to a concern that the cable might contact configuration members of the seat cushion and lead to deterioration of the cable when installing the support case to the side frame.

In consideration of the above circumstances, an object of the present disclosure is to provide a vehicle seat in which a support case, a circuit board, and a side finisher are able to be installed to a side frame in such a manner that a board-connected cable connected to a circuit board is not liable to contact members positioned in the vicinity, while also enabling a task of electrically connecting an electric cable for supplying power to an electric actuator to a circuit board to be executed easily after the support case, the circuit board, and the side finisher have been installed to the side frame.

A vehicle seat of a first aspect of the present disclosure includes a seat cushion frame that is a framework member of a seat cushion and that includes a side frame, a side finisher provided at a side of the seat cushion, a circuit board positioned between the side frame and the side finisher, a support case supporting the circuit board and positioned between the side frame and the side finisher, and a board-connected cable including a first end portion connected to the circuit board, a flexible cable main body that extends from the first end portion, and a second end portion that is a connector connectable to an electric cable for supplying power to an electric actuator. The support case is integrated to the side finisher, one of the side frame or the support case includes an engagement hole, and the other of the side frame or the support case includes an engagement projection. The support case that is integrated to the side finisher is installable to the side frame by the engagement projection being inserted into the engagement hole. The support case includes a cable protection section that, in a side view of the vehicle seat, overlaps with at least part of the cable main body and that does not overlap with at least the connector.

The vehicle seat of the first aspect enables the support case that has been integrated to the side finisher and the circuit board to be installed to the side frame by the engagement projection provided at one of the side frame or the support case being inserted into the engagement hole provided at the other of the side frame or the support case.

Moreover, in the vehicle seat of the first aspect, the cable protection section of the support case overlaps with at least part of the cable main body in a side view of the vehicle seat in a state in which the side finisher and the support case have been installed to the side frame. This means that the support case that has been integrated to the side finisher and the circuit board can be installed to the side frame in a manner in which the board-connected cable connected to the circuit board is not liable to contact members positioned at the vicinity.

Furthermore, in the vehicle seat of the first aspect, the cable protection section of the support case does not overlap with the connector of the board-connected cable in a side view of the vehicle seat in a state in which the side finisher and the support case have been installed to the side frame. This means that the end portion of the electric cable for supplying power to an electric actuator is easily connected to the connector of the board-connected cable. Namely, a task of electrically connecting the electric cable to the circuit board can be executed easily after the support case integrated to the side finisher and the circuit board has been installed to the side frame.

A vehicle seat of a second aspect of the present disclosure is the configuration of the first aspect, the vehicle seat further including a first connector connected to the circuit board, wherein the first end portion of the board-connected cable is a second connector capable of attaching to and detaching from the first connector, and the support case overlaps with the second connector in a side view of the vehicle seat.

The vehicle seat of the second aspect enables the support case integrated to the side finisher and the circuit board to be installed to the side frame in a manner in which the second connector for connecting to the first connector, which is connected to the circuit board, is not liable to contact members positioned in the vicinity.

A vehicle seat of a third aspect of the present disclosure is the configuration of the first aspect or the second aspect, the vehicle seat further including a riser, and a lift arm that is connected to front portions of the riser and the side frame so as to be able to rotate about respective rotational shafts extending in a seat width direction. The cable protection section configures a front portion of the support case, and the cable main body includes a first configuration section having a portion positioned at an outer side of the support case and positioned at a side of the lift arm in a side view of the vehicle seat, and a second configuration section extending in the seat width direction and positioned further toward a front than a movable range of the lift arm.

In the vehicle seat of the third aspect, part of the first configuration section and the second configuration section, which are not overlapping with the support case in a side view, do not contact the lift arm.

As described above the vehicle seat of the present disclosure exhibits the advantageous effect of enabling a support case, a circuit board, and a side finisher to be installed to a side frame such that a board-connected cable connected to a circuit board is not liable to contact members positioned in the vicinity, while also enabling a task of electrically connecting an electric cable for supplying power to an electric actuator to a circuit board to be executed easily after the support case, the circuit board, and the side finisher have been installed to the side frame.

BRIEF DESCRIPTION OF THE DRAWINGS

Exemplary embodiments of the present disclosure will be described in detail based on the following figures, wherein.

DETAILED DESCRIPTION

Description follows regarding a vehicle seat 20 according to an exemplary embodiment of the present disclosure, with reference to the appended drawings. Note that as appropriate in these drawings an arrow FR indicates a seat front side direction, an arrow UP indicates a seat upward direction, and an arrow LH indicates a left side in a seat width direction (left-right direction).

Figure 1:
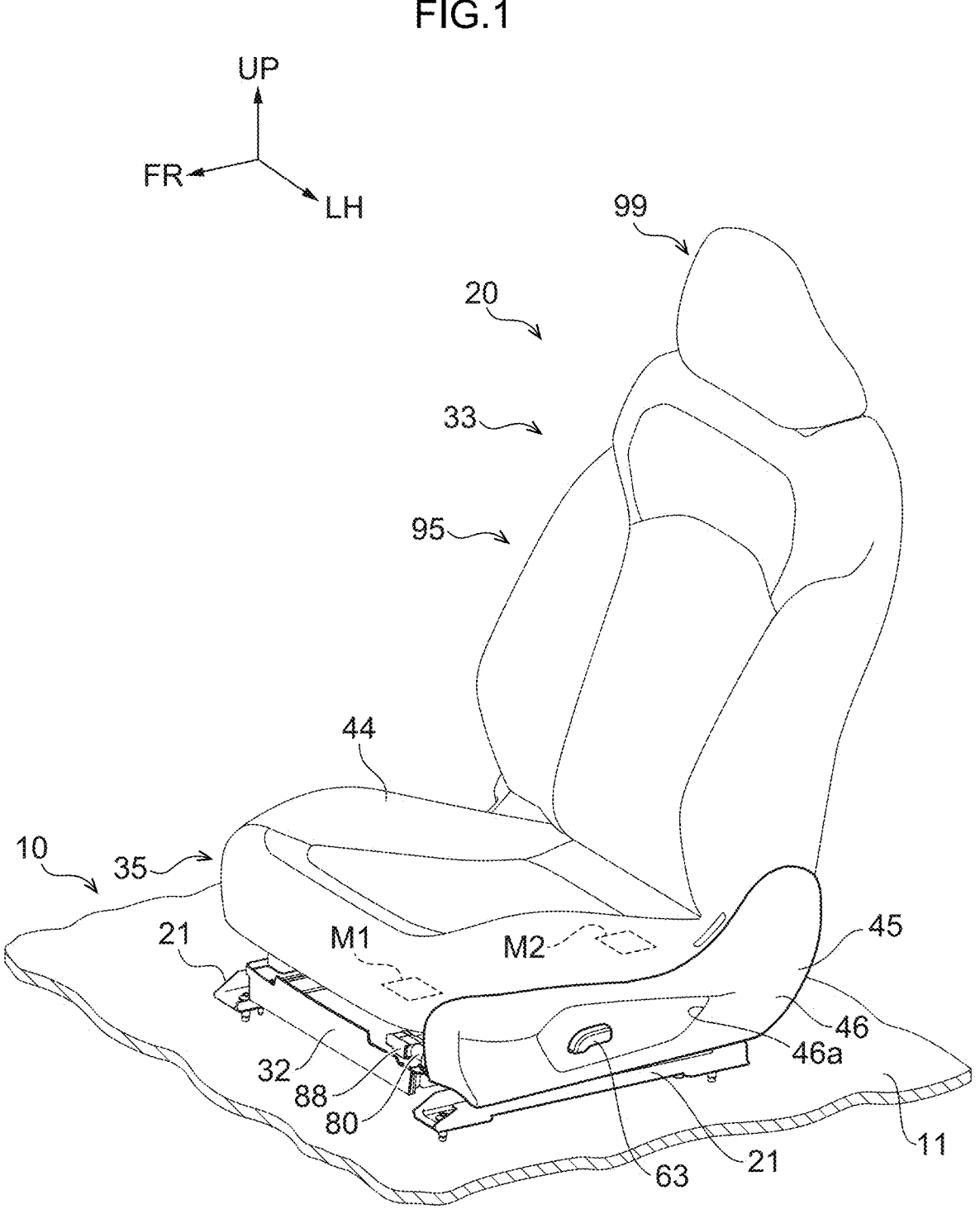
FIG. 1 is a perspective view as viewed from a front side of a vehicle seat according to an exemplary embodiment of the present disclosure.

As illustrated in FIG. 1, a vehicle seat 20 is provided at a vehicle body floor 11 of a vehicle 10. The vehicle seat 20 is a left-side front seat. The vehicle seat 20 includes floor rails 21, upper rails 22 (see FIG. 2 and FIG. 5), risers 23 (see FIG. 5), a coupling member 32, and a seat main body 33.

The floor rails 21 extending as a left-right pair along the front-rear direction are fixed to an upper face of the vehicle body floor 11. The left-right pair of upper rails 22 is supported by the respective floor rails 21 so as to be able to slide. Moreover, a slide lock device (omitted in the drawings) is provided to each of the upper rails 22 to either restrict or permit sliding of the upper rail 22 with respect to the floor rail 21. Furthermore, the vehicle seat 20 also includes a first electric motor (electric actuator) M1 (see FIG. 1) that generates drive force to cause the upper rails 22 to slide with respect to the floor rails 21.

Figure 5:
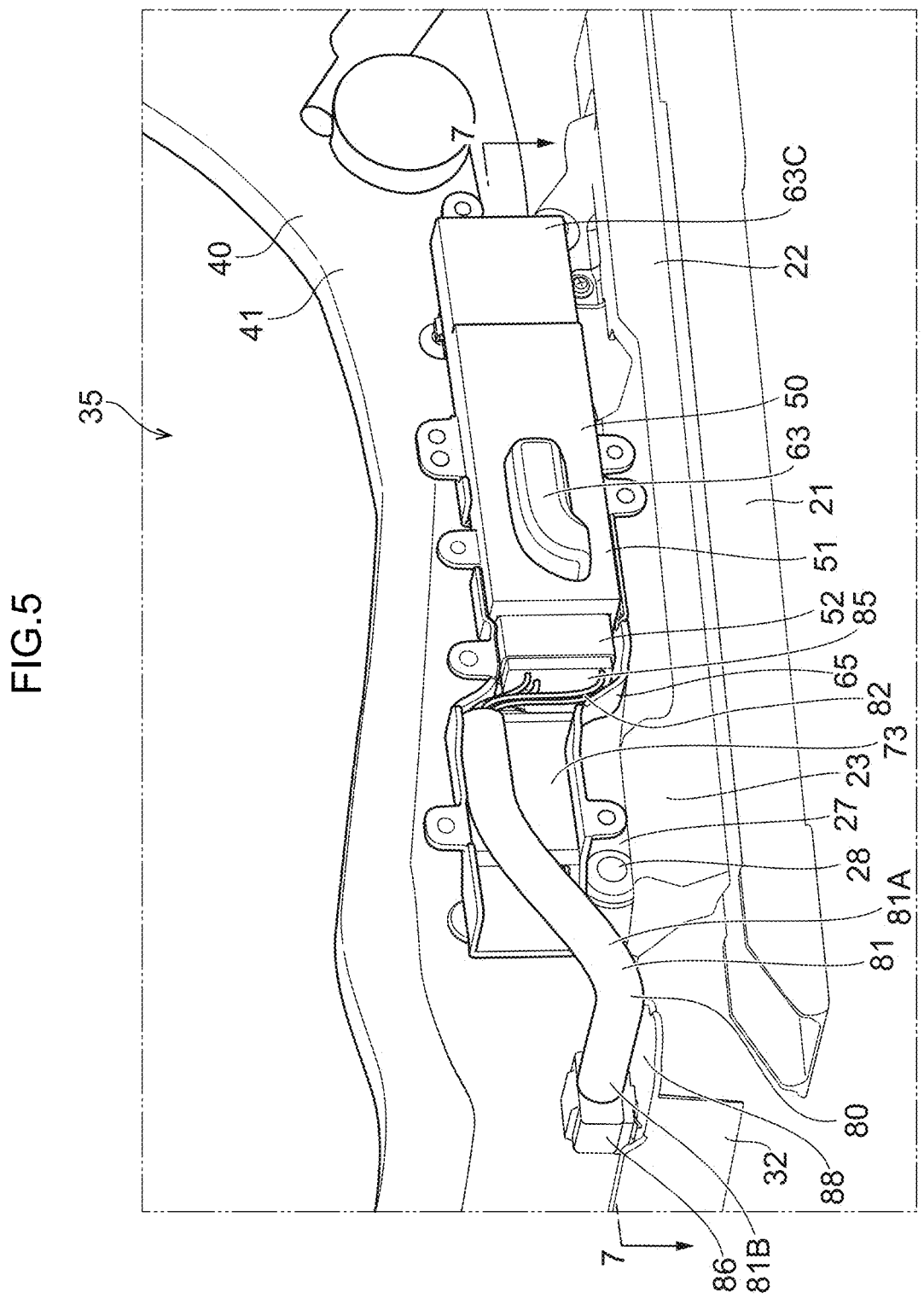
FIG. 5 is a perspective view, as viewed from a front side, of left side portion of a seat cushion when a side finisher has been removed.
Figure 6:
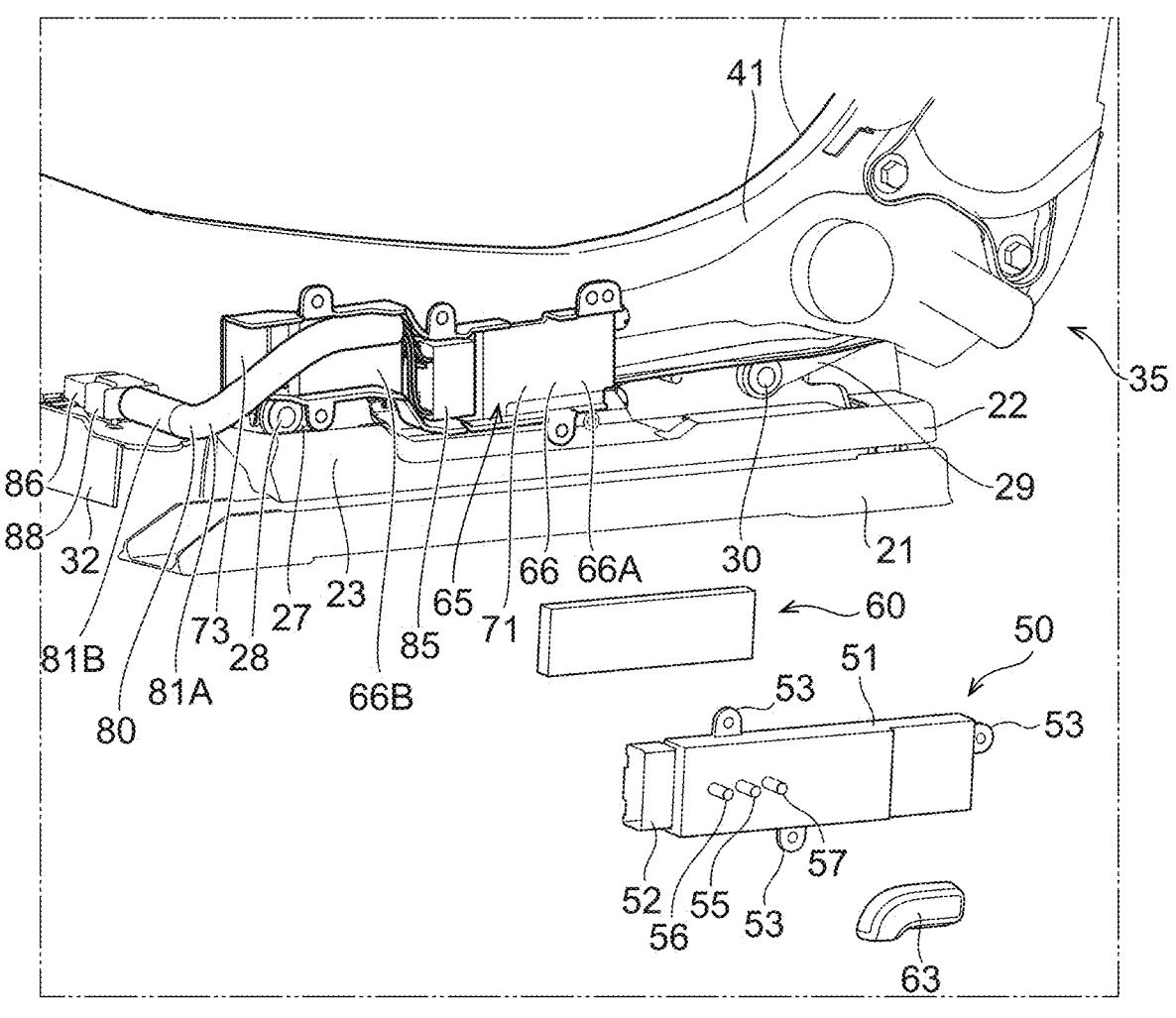
FIG. 6 is a perspective view, as viewed from a front side, of a left side portion of a seat cushion when a side finisher, an inner case, and an operation lever have been removed.

As illustrated in FIG. 5, risers 23 are respectively fixed to each of the upper rails 22. A lifter mechanism is provided at the left and right risers 23. The lifter mechanism includes a left-right pair of front-side lift arms (lift arms) 27, coupling pins (rotation shafts) 28, rear-side lift arms 29, and coupling pins 30. Lower end portions of the left and right front-side lift arms 27 are rotatably connected to respective front end portions of the left and right risers 23 through the coupling pins 28 that extend in the seat width direction (left-right direction). Moreover, as illustrated in FIG. 6, the lower end portions of the left and right rear-side lift arms 29 are rotatably connected to respective rear portions of the left and right risers 23 through the coupling pins 30 that extend in the seat width direction.

Furthermore as illustrated in FIG. 1, the coupling member 32 is positioned between the left and right upper rails 22 and fixed to the left and right upper rails 22. A position, in the front-rear direction, of front end portions of the coupling member 32 is substantially the same as a position, in the front-rear direction, of the front end portions of the upper rails 22.

An upper portion of the lifter mechanism supports the seat main body 33. The seat main body 33 includes a seat cushion 35, a seatback 95, and a headrest 99.

Figure 3:
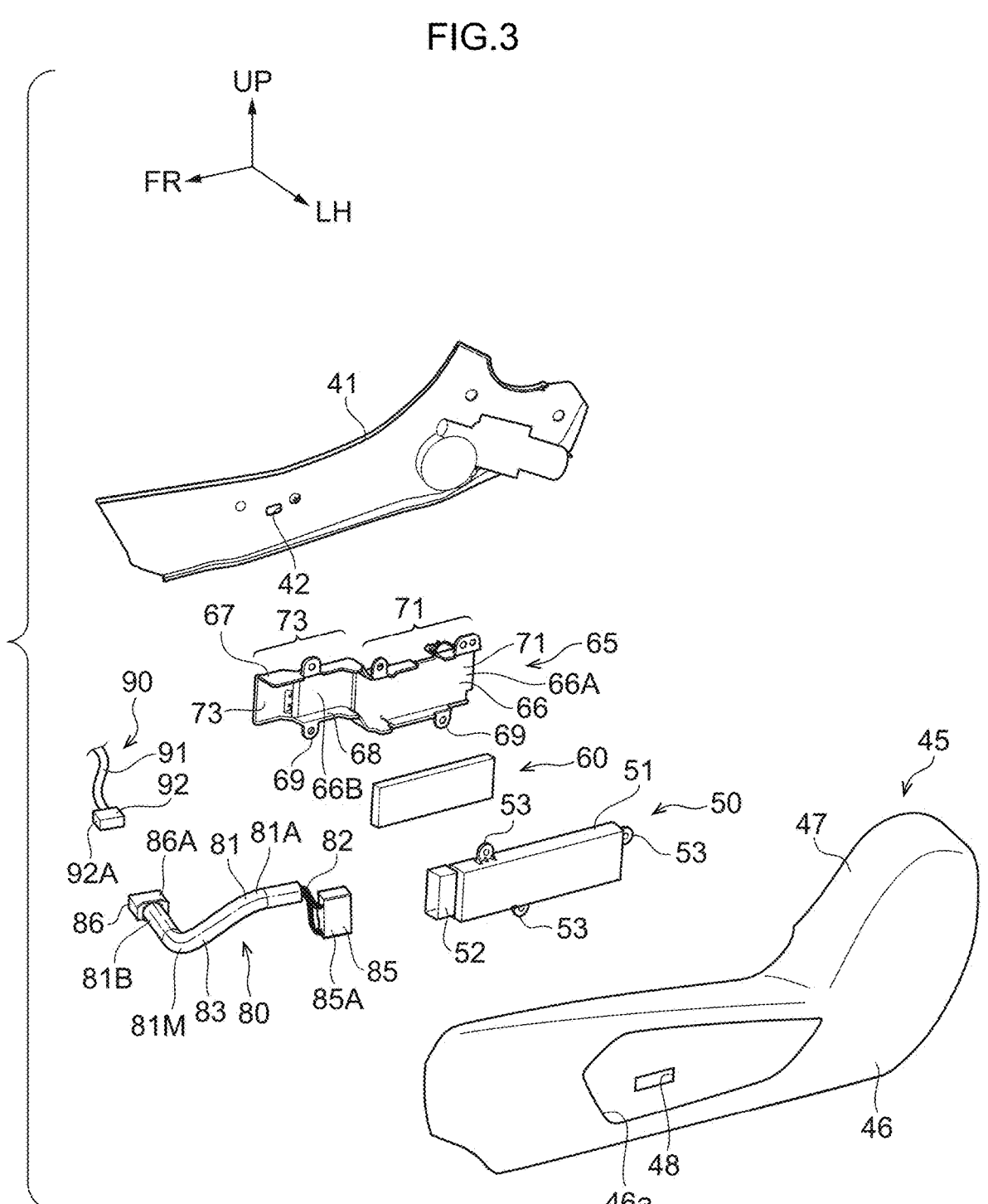
FIG. 3 is an exploded perspective view, as viewed from a left side of a side frame, of a side finisher, an inner case, a circuit board, a switch case, and a board-connected cable.

The seat cushion 35 includes a seat cushion frame 40 that is a framework member, a cushion pad 44, a side finisher 45, an inner case 50, a circuit board 60, an operation lever 63, a switch case (support case) 65, a board-connected cable 80, and an electric cable 90 (see FIG. 3).

The seat cushion frame 40 is made from metal and includes a left-right pair of side frames 41, a front frame (omitted in the drawings) for connecting front end portions of the left and right side frames 41 together, and a rear frame (omitted in the drawings) for connecting rear end portions of the left and right side frames 41 together.

Upper end portions of the left and right front-side lift arms 27 are rotatably connected to front portions of the left and right side frames 41 through rotation shafts (omitted in the drawings) parallel to the coupling pins 28. Similarly, the upper end portions of the left and right rear-side lift arms 29 are rotatably connected to rear portions of the left and right side frames 41 through rotation shafts (omitted in the drawings) parallel to the coupling pins 30. A four-joint link mechanism is configured by the riser 23, the front-side lift arm 27, the rear-side lift arm 29, and the left or right side frame 41. The vehicle seat 20 also includes a second electric motor (electric actuator) M2 (see FIG. 1) for imparting drive force to the lifter mechanism. The seat cushion 35 is raised or lowered with respect to the left and right risers 23 by actuation of the four-joint link mechanism under drive force of the second electric motor M2.

As illustrated in FIG. 3, an engagement hole 42 is formed as a through hole in the left side frame 41. A side face profile of the engagement hole 42 is a substantially rectangular shape.

Figure 2:
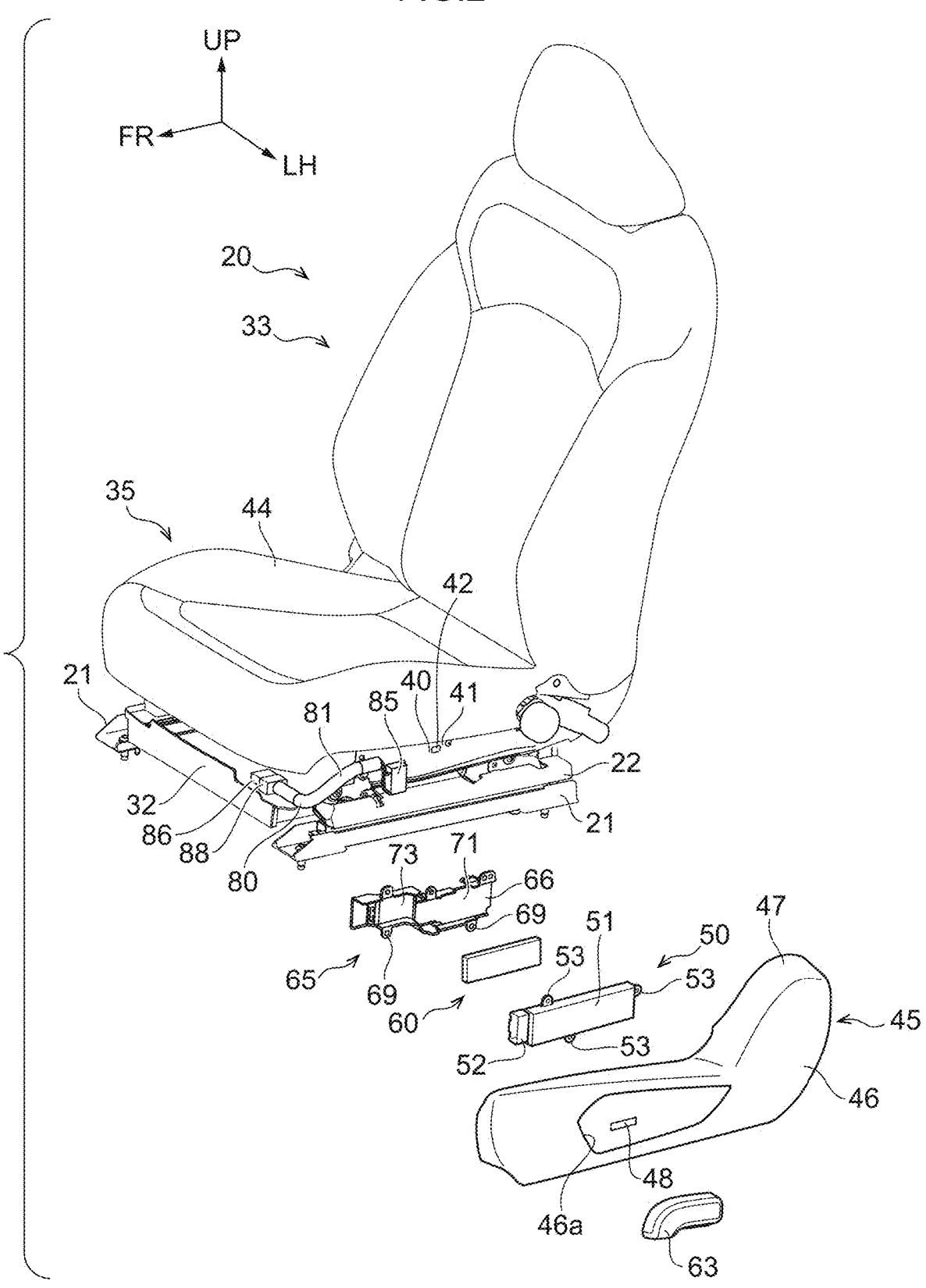
FIG. 2 is a perspective view as viewed from a front side of a vehicle seat when a side finisher, an inner case, a circuit board, a switch case, and an operation lever have been dismantled.

As illustrated in FIG. 2, the cushion pad 44 is installed to an upper portion of the seat cushion frame 40. A lower face of a side portion of the cushion pad 44 is positioned above a lower edge of the side frames 41.

Figure 4:
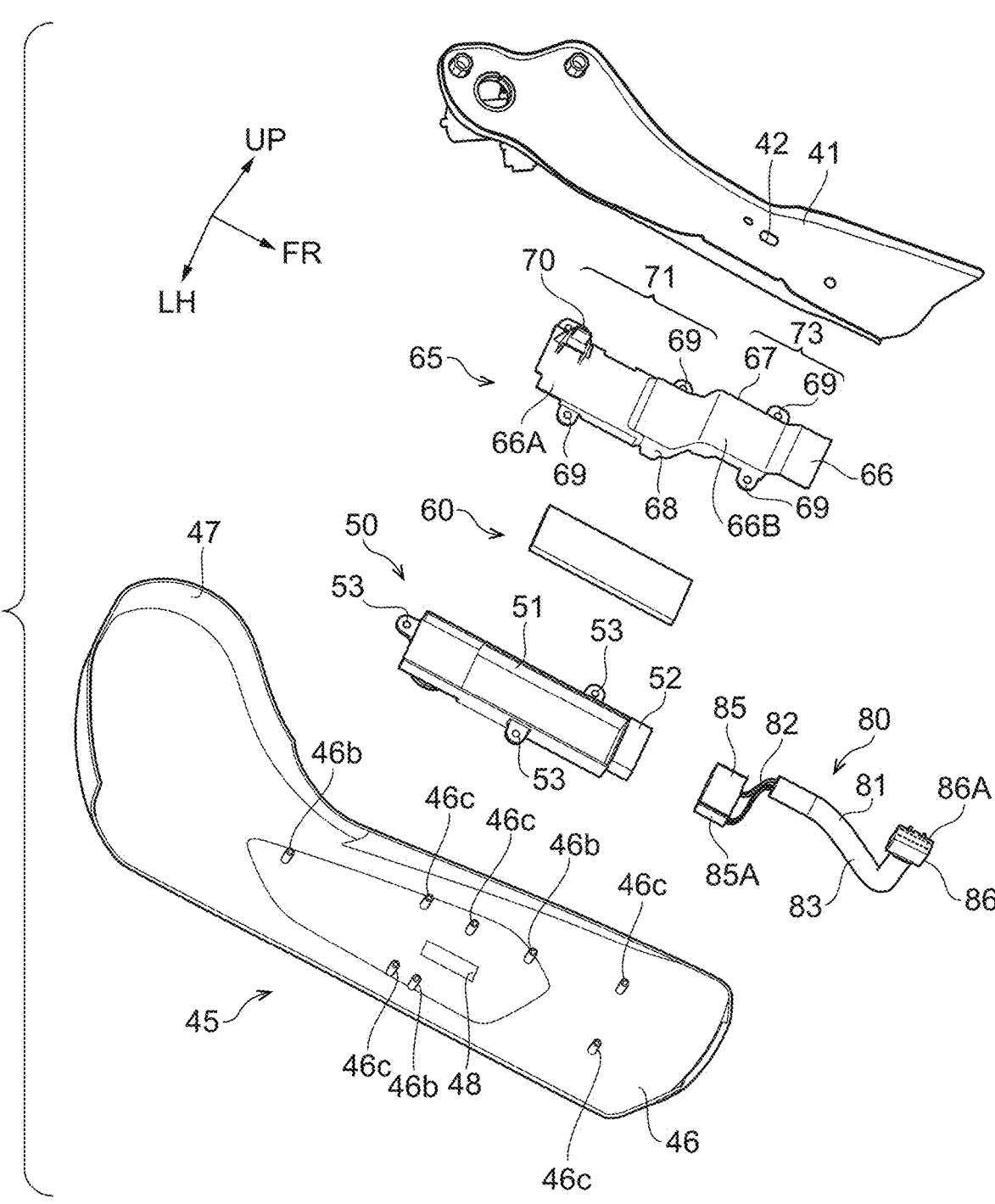
FIG. 4 is an exploded perspective view, as viewed from a right side of a side finisher, of a side frame, a switch case, a circuit board, an inner case, and a board-connected cable.

The side finisher 45 that is an integrally molded product made from a resin is a hollow body with an entirely open right-side face. The side finisher 45 includes a main body plate 46 that is formed with a substantially V-shaped side face profile and configures a left-side face of the side finisher 45, and an outer peripheral flange 47 provided at an outer peripheral edge of the main body plate 46. Moreover, an indentation 46*a* is formed in a left-side face of the main body plate 46, and a through hole 48 is formed in a bottom face of the indentation 46*a*. Furthermore, as illustrated in FIG. 4, three first support projections 46*b* and five second support projections 46*c* are provided at the right-side face of the main body plate 46 so as to project toward the right side. A female screw groove is formed at leading-end faces of the first support projections 46*b* and the second support projections 46*c*.

The inner case 50 that is an integrally molded product made from a resin includes a main body portion 51 and a connector (first connector) 52 as illustrated in FIG. 3 and FIG. 4. The main body portion 51 is a hollow body having a cuboidal shape with an entirely open right-side face. The connector 52 is connected to a front-end face of the main body portion 51. The male connector 52 is a tubular body having a rectangular cross-section with an open front face. Although not illustrated in the drawings, plural metal contact pins are fixed to a front wall portion of the main body portion 51. A front portion of each of the contact pins is positioned in an internal space of the connector 52, and a rear portion of each of the contact pins is positioned in an internal space of the main body portion 51. Furthermore, three projection tabs 53 are provided at an outer peripheral face of the main body portion 51, with a through hole formed in each of the projection tabs 53. Furthermore, as illustrated in FIG. 6, a support pin 55 is fixed to a left-side face of the main body portion 51, and two movable members 56, 57 that are moveable relative to each other (omitted in FIG. 2 and FIG. 3) are supported at the left-side face of the main body portion 51.

An electric circuit (omitted in the drawings) made from a conductive material is formed on a left-side face of the substantially rectangular circuit board 60 illustrated in FIG. 3 and FIG. 4. Multiple electrical components are provided at the left-side face of the circuit board 60. The circuit board 60 is inserted inside the main body portion 51 in a state in which the electric circuit faces toward the bottom face of the main body portion 51 of the inner case 50, and is fixed to the main body portion 51 by a fixing method. Rear end portions of each of the contact pins that have been fixed to the front wall portion of the main body portion 51 are soldered to the electric circuit.

Figure 8:
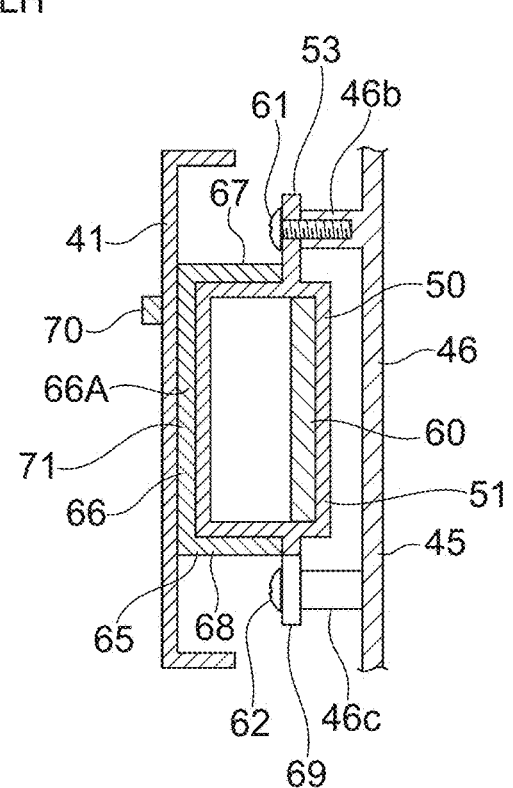
FIG. 8 is a cross-section taken along arrow lines 8-8 of FIG. 7.

Furthermore, as illustrated in FIG. 8, the inner case 50 thereby integrated to the circuit board 60 is inserted into the internal space of the side finisher 45 in a state in which each of the projection tabs 53 of the inner case 50 make contact with the leading-end face of the corresponding first support projections 46*b* of the side finisher 45. A screw 61 that has been inserted from the right side into a through hole of each of the projection tabs 53 is screwed onto the female screw groove of the first support projection 46*b* and each of the projection tabs 53 is fixed to the corresponding first support projection 46*b* to by each of the screws 61.

Furthermore, a connection portion (omitted in the drawings) that protrudes toward the right side from a base end portion (lower end portion) of the operation lever 63 passes through the through hole 48 of the side finisher 45 and is connected to the support pin 55 of the inner case.

The switch case 65, which is an integrally molded product made from a resin and illustrated in FIG. 3, FIG. 4, and FIG. 7 to FIG. 9, is a hollow body having an entirely open left-side face. The switch case 65 includes a base plate 66 configuring a right-side face, of the switch case 65, as viewed from the left side. The base plate 66 also includes a rear configuration portion 66A configuring a rear portion of the base plate 66, and a front configuration portion 66B configuring a front portion of the base plate 66. The front configuration portion 66B is positioned at a higher level than the rear configuration portion 66A. Moreover, the switch case 65 includes an upper flange 67 provided at an upper edge of the base plate 66 and a lower flange 68 provided at a lower edge of the base plate 66. A distance in the height direction between the lower face of the upper flange 67 and the upper face of the lower flange 68 is slightly larger than a distance in the height direction between the upper face and the lower face of the main body portion 51 of the inner case 50. Furthermore, five projection tabs 69 are provided at an edge of an outer face of the upper flange 67 and the lower flange 68, and a through hole is formed in each of the projection tabs 69. Furthermore, an engagement projection 70 is provided at a rear portion of the right-side face of the rear configuration portion 66A so as to project toward the right side. A profile of the engagement projection 70 is substantially the same as that of the engagement hole 42 of the side frames 41. Moreover, the switch case 65 is broadly categorized into two locations. Namely, the switch case 65 is configured by a board protection section 71 positioned further toward the rear than a boundary portion between the rear configuration portion 66A and the front configuration portion 66B, and by a cable protection section 73 positioned further toward a front than this boundary portion.

As illustrated in FIG. 5 and FIG. 7 to FIG. 9, the board protection section 71 of the switch case 65 covers the inner case 50 from the right side. When doing so the upper flange 67 of the board protection section 71 contacts an upper face of the inner case 50, and the lower flange 68 of the board protection section 71 contacts a lower face of the inner case 50, and also the connector 52 of the inner case 50 is positioned in a front end portion of the internal space of the board protection section 71. Furthermore, the switch case 65 covers the inner case 50 in this manner, and as illustrated in FIG. 8, each of the projection tabs 69 of the switch case 65 contacts a leading-end face of the corresponding second support projections 46*c* of the side finisher 45. Furthermore, a screw 62 inserted from the right side into the through hole in each of the projection tabs 69 is inserted into the female screw hole of the second support projections 46*c*, and each of the projection tabs 69 is fixed to the corresponding second support projections 46*c* by each of the screws 62.

As illustrated in FIG. 3, the board-connected cable 80 includes a flexible cable main body 81, and female connectors 85, 86 respectively fixed to the two end portions of the cable main body 81. The cable main body 81 includes multiple harnesses 82 that are formed from a conductive material and have a peripheral face covered by an insulating member, and a covering tube 83 formed from an insulating resin material so as to cover a peripheral face of a harness bundle that is a collective body configured by all of the harnesses 82. The connector (first end portion) (second connector) 85 includes an insulator 85A that is a substantially cuboidal body formed with plural holes in a leading-end face thereof, and plural contactors (omitted in the drawings) made from metal are provided inside the insulator 85A, and are connected to the harnesses 82. Similarly, the connector (second end portion) 86 includes an insulator 86A that is a substantially cuboidal body formed with plural holes in a leading-end face thereof, and plural contactors (omitted in the drawings) made from metal are provided inside the insulator 86A, and are connected to the harnesses 82.

Figure 7:
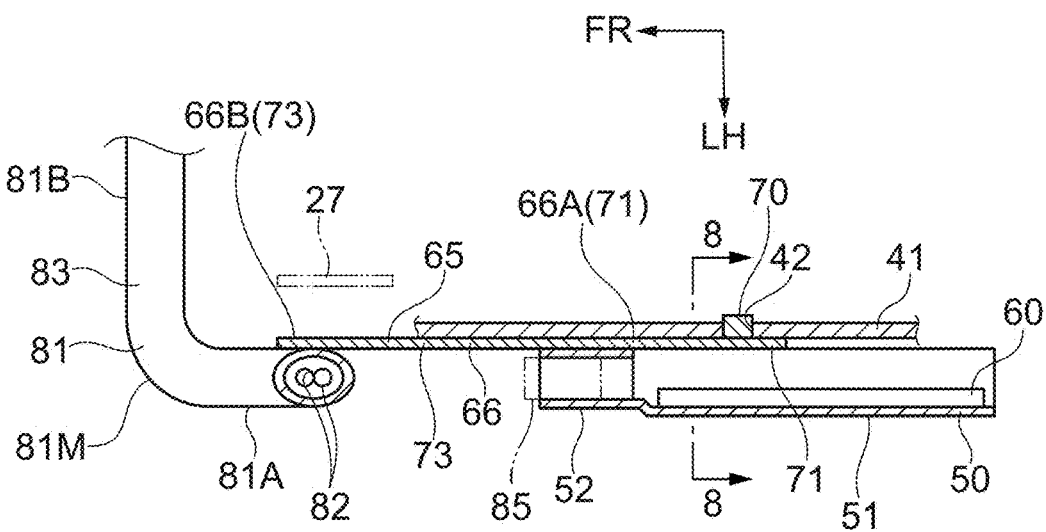
FIG. 7 is a cross-section taken along arrow lines 7-7 of FIG. 5.

As illustrated in FIG. 5 and FIG. 7, the connector 85 of the board-connected cable 80 is connected from a front to the connector 52 of the inner case 50. This means that each of the contact pins provided at the connector 52 pass through a hole in the insulator 85A and make contact with the respective contacts of the connector 85. Thus when the connector 85 is connected to the connector 52, there is hardly any concern that the connector 85 might come out toward the front from the connector 52 unless a force of a given magnitude toward the front acts on the connector 85. Furthermore, a rear portion of the cable main body 81 is positioned at the left side of the cable protection section 73.

The side finisher 45, the inner case 50, the circuit board 60, the switch case 65, and the board-connected cable 80 are integrated together in this manner, and the engagement projection 70 provided at the right-side face of the switch case 65 is press-fitted into the engagement hole 42 provided at the left-side of the side frame 41. As illustrated in FIG. 1, the integrated body including the side finisher 45, the inner case 50, the circuit board 60, the switch case 65, and the board-connected cable 80 is thereby installed to a left-side face of the side frame 41.

Figure 9:
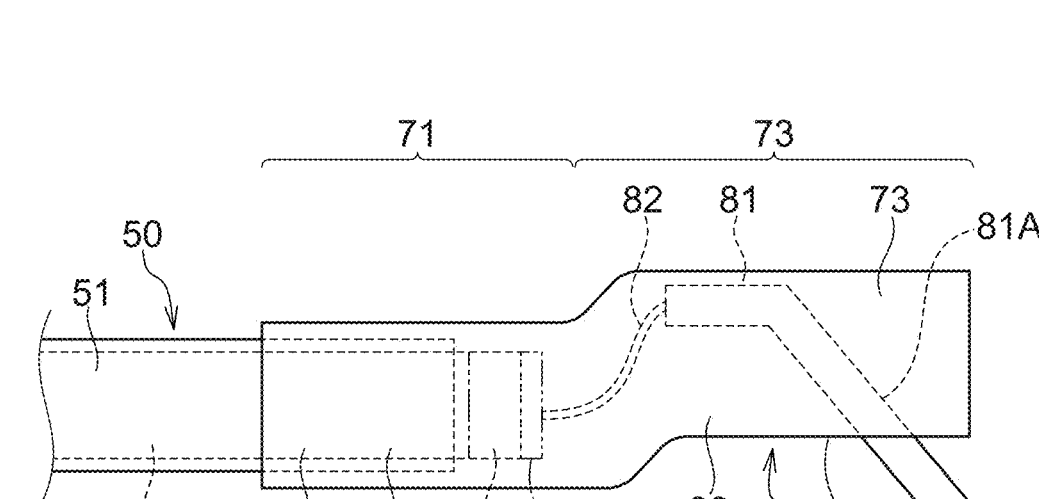
FIG. 9 is a side view, as viewed from a right side of an inner case, of a circuit board, a switch case, and a board-connected cable.

As illustrated in FIG. 7, an intermediate portion 81M is part of the cable main body 81 and is defined as being a specific location positioned further toward a front than a front end of the switch case 65 (the cable protection section 73) in a side view. A first configuration portion 81A is a location positioned further toward the connector 85 side than the intermediate portion 81M of the cable main body 81, and a second configuration portion 81B is a location positioned further toward the connector 86 side than the intermediate portion 81M of the cable main body 81. As illustrated in FIG. 9, locations other than a front portion of the first configuration portion 81A are covered by the cable protection section 73 of the switch case 65 when viewed from the right side. In other words, the front portion of the first configuration portion 81A is positioned outside the cable protection section 73 in a side view when viewed from the right side.

The intermediate portion 81M of the cable main body 81 is bent as illustrated in FIG. 5 to FIG. 7, and as illustrated in FIG. 5, an intermediate portion of the second configuration portion 81B is supported by a bracket 88 fixed to an upper face of a front end portion of the coupling member 32. The second configuration portion 81B is accordingly parallel or substantially parallel to the left-right direction. The second configuration portion 81B is also positioned further toward the right side than the intermediate portion 81M. Moreover, in plan view as illustrated in FIG. 7, the first configuration portion 81A is positioned further toward the left side than the front-side lift arm 27, and the second configuration portion 81B is positioned directly in front of the front-side lift arm 27. The position of the front-side lift arm 27 illustrated in FIG. 7 is a position when the front-side lift arm 27 has been maximally rotated forward. Namely, the second configuration portion 81B is positioned further toward a front than a movable range of the front-side lift arm 27.

The electric cable 90 illustrated in FIG. 3 includes a flexible cable main body 91, and a male connector 92 that is fixed to a one-end portion of the cable main body 91. The cable main body 91 includes harnesses made from a conductive material, and a covering tube made from an insulating material and covering a peripheral face of the harnesses. The connector 92 includes an insulator 92A that is substantially cuboidal body, and plural contact pins (omitted in the drawings) that are supported by the insulator 92A and that are connected to the harnesses. The first electric motor M1 and the second electric motor M2 are connected to the other-end portion of the electric cable 90. The insulator 92A of the electric cable 90 is connected to the connector 86 of the board-connected cable 80, and each of the contact pins of the connector 92 pass through a hole in the insulator 86A and make contact with the respective contact pins of the connector 86.

A lower end portion of the seatback 95 is connected to a rear end portion of the seat cushion 35 through a reclining mechanism (omitted in the drawings). A lumber support mechanism (omitted in the drawings) is provided inside the seatback 95. A reclining electric motor (omitted in the drawings) is also provided inside the seat cushion 35 for actuating the reclining mechanism. Furthermore, a lumber support electric motor (omitted in the drawings) is also provided inside the seatback 95 for actuating the lumber support mechanism. A left-side face of the inner case 50 is provided with a reclining operation lever and a lumber support operation lever that are non-illustrated movable members. Left end portions of the reclining operation lever and the lumber support operation lever pass through holes (omitted in the drawings) provided at the side finisher 45 and are positioned in the indentation 46a of the side finisher 45.

The headrest 99 is provided at an upper end portion of the seatback 95. This completes the vehicle seat 20 illustrated in FIG. 1.

When the operation lever 63 is moved in the front-rear direction or the up-down direction with respect to the support pin 55, the movable members 56, 57 pressed by the operation lever 63 are moved, and switches (omitted in the drawings) provided at the electric circuit of the circuit board 60 are switched thereby. The first electric motor M1 is controlled by the electric circuit when the operation lever 63 is moved in the front-rear direction. The seat main body 33 (the upper rails 22) are thereby moved in the front-rear direction relative to the floor rails 21. The second electric motor M2 is controlled by the electric circuit when the operation lever 63 is moved in the up-down direction. The seat cushion 35 is thereby raised or lowered with respect to the left and right risers 23.

When the reclining operation lever or the lumber support operation lever have been moved with respect to the inner case 50, a movable member (omitted in the drawings) provided at the inner case 50 is actuated, and a switch provided at the electric circuit is switched thereby. The reclining electric motor is controlled by the electric circuit when the reclining operation lever is moved. The seatback 95 is thereby rotated with respect to the seat cushion 35. The lumber support electric motor is controlled by the electric circuit when the lumber support operation lever is moved. The lumber support mechanism is actuated thereby.

In the vehicle seat 20 of the present exemplary embodiment as described above, in a state in which the side finisher 45, the inner case 50, the circuit board 60, and the switch case 65 have been installed to the left-side side frame 41, the cable protection section 73 of the switch case 65 overlaps with a part of the first configuration portion 81A of the board-connected cable 80 and the board protection section 71 overlaps with the connector 85 in a side view. This means that the connector 85 and the part of the first configuration portion 81A of the board-connected cable 80 connected to the circuit board 60 are configured so as not to contact members positioned in the vicinity, enabling the switch case 65 to be integrated together with the side finisher 45 and installed to the left side frame 41.

Furthermore, in a state in which the side finisher 45 and the switch case 65 are installed to the left side frame 41, the connector 86 of the board-connected cable 80 is not overlapped with the switch case 65 in a side view. This means that the task of connecting the connector 92 of the electric cable 90 to the connector 86 of the board-connected cable 80 can be executed easily.

Furthermore in plan view, the first configuration portion 81A of the board-connected cable 80 is positioned further toward the left side than the front-side lift arm 27, and also the second configuration portion 81B is positioned further toward the front than the movable range of the front-side lift arm 27. This means that there is hardly any concern that the front-side lift arm 27 might contact the cable main body 81 and cause deterioration of the cable main body 81 when the front-side lift arm 27 is moved.

Although exemplary embodiment of the present disclosure have been described, the present disclosure is not limited by these exemplary embodiments.

For example, the side frames 41 may be provided with an engagement projection 70 instead of the engagement hole 42, and the switch case 65 may be provided with an engagement hole 42 instead of the engagement projection 70.

The switch case 65 may be fixed to the side finisher 45 after the connector 85 of the board-connected cable 80 has been connected to the connector 52 of the inner case 50.

The inner case 50 and the circuit board 60 may be integrally formed.

The board-connected cable 80 does not necessarily include the connector 85, and the inner case 50 is not necessarily provided with the connector 52. In other words, first end portion of the harnesses 82 of the board-connected cable 80 may be soldered to the electric circuit of the circuit board 60.

What is claimed is:

1. A vehicle seat, comprising:
a seat cushion frame that is a framework member of a seat cushion and that includes a side frame;
a side finisher provided at a side of the seat cushion;
a circuit board positioned between the side frame and the side finisher;
a support case supporting the circuit board and positioned between the side frame and the side finisher; and
a board-connected cable including a first end portion connected to the circuit board, a flexible cable main body that extends from the first end portion, and a second end portion that is a connector connectable to an electric cable for supplying power to an electric actuator, wherein:
the support case is integrated to the side finisher;

one of the side frame or the support case includes an engagement hole;
the other of the side frame or the support case includes an engagement projection;
the support case is installable to the side frame by the engagement projection being inserted into the engagement hole; and
the support case includes a cable protection section that, in a side view of the vehicle seat, overlaps with at least part of the cable main body and that does not overlap with at least the connector.

2. The vehicle seat of claim 1, further comprising a first connector connected to the circuit board, and wherein:
the first end portion of the board-connected cable is a second connector capable of attaching to and detaching from the first connector; and
the support case overlaps with the second connector in a side view of the vehicle seat.

3. The vehicle seat of claim 1, further comprising:
a riser; and
a lift arm that is connected to front portions of the riser and the side frame so as to be able to rotate about respective rotational shafts extending in a seat width direction, wherein:
the cable protection section configures a front portion of the support case; and
the cable main body includes:
a first configuration section having a portion positioned at an outer side of the support case and positioned at a side of the lift arm in a side view of the vehicle seat, and
a second configuration section extending in the seat width direction and positioned further toward a front than a movable range of the lift arm.

4. The vehicle seat of claim 2, further comprising:
a riser; and
a lift arm that is connected to front portions of the riser and the side frame so as to be able to rotate about respective rotational shafts extending in a seat width direction, wherein:
the cable protection section configures a front portion of the support case; and
the cable main body includes:
a first configuration section having a portion positioned at an outer side of the support case and positioned at a side of the lift arm in a side view of the vehicle seat, and
a second configuration section extending in the seat width direction and positioned further toward a front than a movable range of the lift arm.

* * * * *